SYSTEM FOR CANCELLATION OF GROUND REFLECTIONS

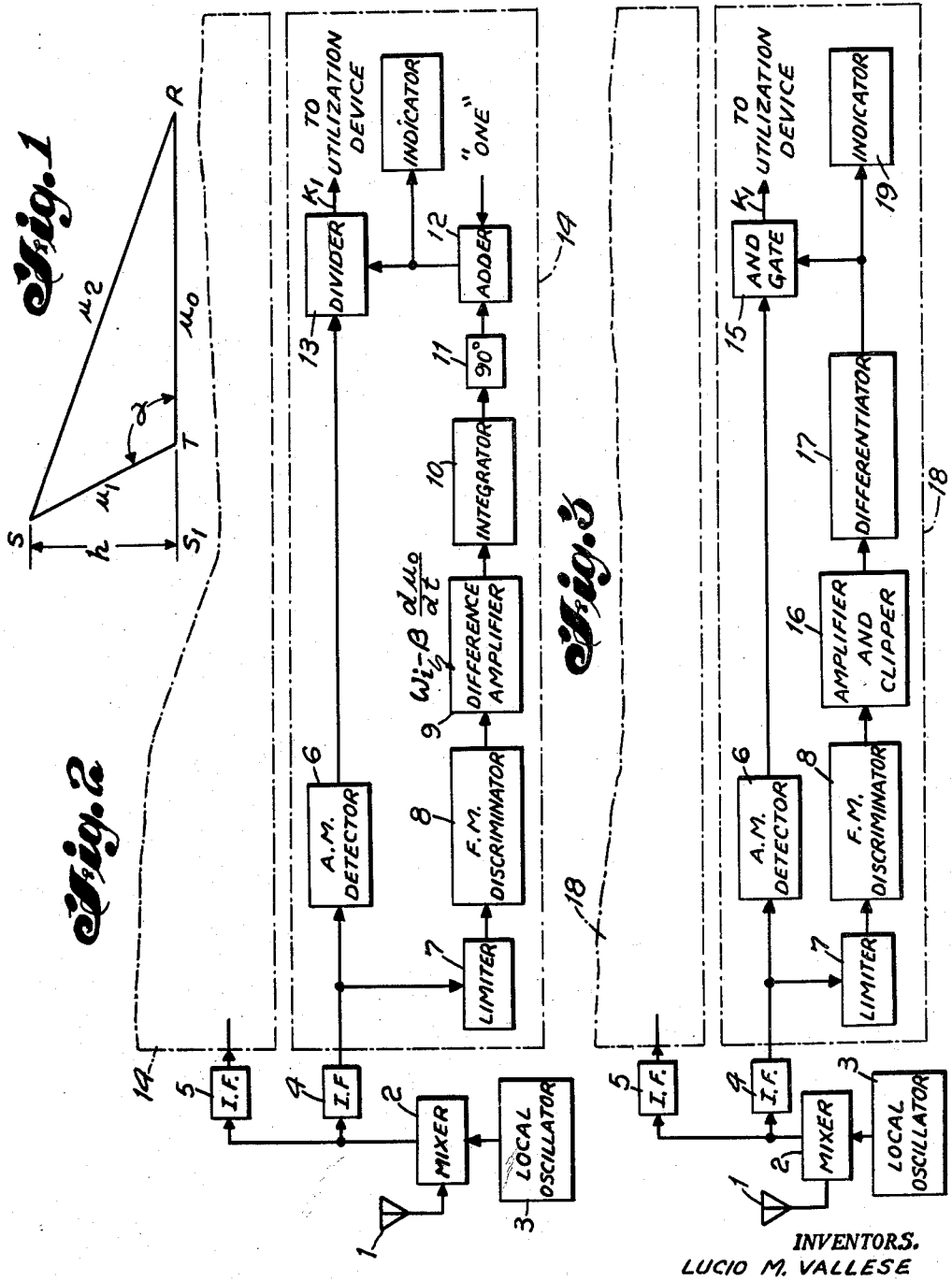

Lucio M. Vallese, Glen Ridge, and Leon Himmel, Cedar Grove, N.J., assignors to International Telephone and Telegraph Corporation, Nutley, N.J., a corporation of Maryland
Filed Mar. 21, 1961, Ser. No. 97,231
1 Claim. (Cl. 325—476)

This invention relates to aircraft navigation systems and more particularly to the cancellation of spurious reflections in radio navigational guidance systems.

Modern advances in aircraft and missile guidance systems have permitted the realization of great improvements in the control of the vehicle along a desired path. Some systems, such as the instrument landing systems extensively used in aircraft navigation control at airports, make use of two antennas with overlapping radiation patterns. These are characterized by an appropriate modulation, such as 90 and 150 c.p.s., respectively, in the case of the ILS systems, and establish an equisignal path in the direction of the desired course. The receiver is provided with an amplitude modulation detector and two separate filters from which the measure of the amplitude of the signal received from each individual pattern is obtained. The difference or the ratio between these two outputs may be used as an indication of the location and course of the vehicle. Although this principle is straightforward and simple, complications arise when reflections from secondary radiators, such as ground obstacles or other large objects that may be present in the vicinity of the receiver, are present. As a result of these reflections, the equisignal path is no longer a straight line and actually assumes a wavy appearance, "scalloping," oscillating about the true path. In certain cases, these deviations from the true path are very large and cannot be followed by the guidance control system placed on board the vehicle. In order to remove these disadvantages, several different approaches may be followed. The most obvious, of course, consists of removal of the spurious radiators by appropriate smoothing of the surrounding terrain and screening of rough spots. In many cases, such an approach is unfeasible as, for instance, where hangers are present in the vicinity. In particular, in missile guidance systems where the radio path is provided at the firing station and the missile follows it away from the radiator and over enemy territory, it is obvious that such a correction is impossible. One method for correction of spurious reflections, which is used in the ILS system, is to place a capacitor of large capacity across the indicating meter. This allows for cancellation of ground reflections which introduce scalloping or oscillations about the true path at the rate of about two or three cycles per second, or higher. However in many cases the frequency of scalloping is much smaller, for instance a fraction of one cycle per second, and the corresponding scalloping components cannot be filtered out by the capacitor. Furthermore, when such a type of filter is used, the carrier cannot be modulated, since the modulation bandwidth is limited by the filter pass band.

It is therefore an object of this invention to provide a system for cancellation of ground reflections in radio navigational guidance systems.

It is another object to provide a system for cancellation of ground reflections in navigational guidance systems without affecting the amplitude modulation of the original carrier.

A feature of this invention is the provision of a system for suppression of undesired signals mixed with desired signals, both said signals being amplitude modulated signals and which comprises means to receive the mixture of signals including other frequency modulated signals, the frequency modulated signals being related to the amplitude modulated undesired signals. There is also provided a means to detect the amplitude modulated signals and the frequency modulated signals, means to derive a control signal from the frequency modulated signals and means responsive to the control signal to derive the desired amplitude modulated signal free from the undesired signals.

Another feature of this invention in one embodiment is that the control signal derived from the frequency modulated signals is used to modify continuously the detected amplitude modulated signals so that information signals become free from the spurious signals.

In another embodiment, the control signal derived from the frequency modulated signal is utilized to control a gate through which is passed the desired amplitude modulated signal only.

The above-mentioned and other features and objects of this invention will become more apparent by reference to the following description taken in conjunction with the accompanying drawings, in which:

FIGURE 1 is a diagram useful in explaining the concept of this invention;

FIGURE 2 is a block diagram of a preferred embodiment of this invention; and

FIGURE 3 is another embodiment of this invention.

This invention applies to a radio navigation system having a fixed transmitter which emits two constant frequency signals with appropriate amplitude modulation for aircraft control purposes. The antenna array is designed in such a way as to determine a straight line equisignal path in space which may be used to guide such an aircraft. An example of such a system is the instrument landing system now in general use at airports throughout the world. However, due to spurious reflections from the ground (clutter), the equisignal path in general deviates in oscillatory fashion from the straight line, as has been above described. With reference of FIGURE 1, one indicates with $\omega_c$ the carrier angular frequency, with $\beta=\omega_c/c$ the propagation constant, with $u_1$, $u_2$, $u_0$ the path lengths from radiator to reflector, from reflector to receiver and from radiator to receiver respectively, with $A/u_0=K_1$, $\eta A/u_1=K_2$ the amplitudes of the radiated signals arriving respectively at the aircraft receiver and at the reflector S, with $\rho^0$ the reflection coefficient at S. It is assumed that the representation may be based on the far field expressions; the factor $\eta$, which is less than one, is introduced to take into account the directivity of the pattern of radiator T. The signal arriving at the reflector may be written as follows:

(1) $\qquad K_2 \cos(\omega_c t - \beta u_1)$ and the secondary signal arriving at the receiver may be written as follows:

(2) $\qquad \rho \frac{K_2}{u_2} \cos(\omega_c t - \beta(u_1+u_2) - \delta)$

Superimposing the direct signal, (3) $\quad K_1 \cos(\omega_c t - \beta u_0)$ and letting $$\rho \frac{K_2}{u_2} = mK_1$$

the final resultant at the receiver may be written as follows:

(4)
$$K_1 \sqrt{1+m^2+2m\cos(\beta\Delta+\delta)} \cos\left[\omega_c t - \beta u_0 - \tan^{-1}\frac{m\sin(\beta\Delta+\delta)}{1+m\cos(\beta\Delta+\delta)}\right]$$

In this expression $\Delta = u_1 + u_2 - u_0$ is the over-all path difference, and $$m = \rho\frac{K_2}{u_2 K_1} = \rho u_0 \eta / u_1 u_2$$

is a slowly varying function of location and is less than one. The above expression may be simplified as follows:

(5) $\quad K_1[1+m\cos(\beta+\delta)]$
$\qquad\qquad \cos[\omega_c t - \beta u_0 - m\sin(\beta\Delta+\delta)]$ Hence, the resultant signal is modulated in amplitude and in frequency, with an amplitude function (6) $\quad K_1[1+m\cos(\beta\Delta-\delta)]$ of variable instantaneous frequency, and an instantaneous frequency (7) $\quad \omega_c - \beta\dfrac{du_0}{dt} - m\beta\dfrac{d\Delta}{dt}\cos(\beta+\delta)$ It is noted that, if the reflection is missing, the signal amplitude is constant and the instantaneous frequency is:

(8) $\quad \omega_c - \beta\dfrac{du_0}{dt}$

Since the receiver is assumed to be moving at a constant velocity $\pm v$, the above frequency is constant.

When more than one reflector is present, assuming that their reflection coefficients are small and that their polarization distortions are negligible, the resultant signal at the receiver may be written as follows:

$K_1[1+\Sigma M_i \cos(\beta\Delta_i+\delta_i)]$
$\qquad\qquad \cos[\omega_c t\beta u_0 - \Sigma m \sin(\beta\Delta_i+\delta_i)]$ (9) $\quad K_1[1+m_i \cos(\beta\Delta_i+\delta_i)]$
$\qquad\qquad \cos[\omega_c t - \beta u_0 - \Sigma m_i \sin(\beta\Delta_i+\delta_i)]$ In this expression, $K_1$ is the amplitude of the transmitted signal which, in general, varies in time according to the impressed modulation information, and $\omega_c$ is the carrier frequency. In addition, with reference to FIGURE 1, the following other symbols are used:

$\Delta_i = u_{1i} + u_{2i} - u_{0i}$ are the various path differences $\delta_i$ are the phase angles at the reflectors $m_i \cong \rho_i \dfrac{K_{2i}}{u_{2i}K_1}$ are quantities depending upon the reflection coefficients and the location of the aircraft. It is assumed that $m_i \ll 1$.

$K_{2i}$ are the amplitudes of the signal at each reflector

Examination of Equation 9 shows that the received signal possesses two distinct amplitude modulations, i.e., that impressed at the transmitter and that impressed by the spurious reflections and represented by the factor

(10) $\quad 1+\Sigma m_i \cos(\beta\Delta_i+\delta_i)$

In addition, the signal possesses frequency modulation of the instantaneous frequency

(11) $\quad \omega_c - \beta\dfrac{du_0}{dt} - \Sigma m_i \beta\dfrac{\Delta_i}{dt}\cos(\beta\Delta_i+\delta_i)$ The fundamental problem for the utilization of the system of this invention is that of measuring the instantaneous amplitude of $K_1$, eliminating the error components represented by the factor (10).

This invention is based on the fundamental observation that while the amplitude modulation of the signal possesses both the modulation of the original signal and that of the spurious reflections, the angular modulation is only a function of the spurious reflections. Hence, such modulation may be utilized to provide a suitable control signal to remove the error component from the amplitude terms of Equation 9.

Referring to FIGURE 2, a receiving antenna 1 mounted on the aircraft which receives both the transmitted signals from the fixed transmitter of a navigation beacon (not shown) and the spurious reflections. The signals are fed into a mixer 2 where they are mixed with the signals from the local oscillator 3 and are then fed to intermediate frequency amplifiers 4 and 5 which have band pass frequencies for each of the two amplitude modulated signals transmitted as described. For an explanation of this invention, it is sufficient to describe only the operations performed on the signals derived from one channel, it being understood that similar operations are performed on the signals derived from the intermediate frequency amplifier 5. From the intermediate frequency amplifier 4, the signals are fed to an amplitude modulation detector 6 and to a limiter 7 from which they are then fed to the FM discriminator 8. It can be assumed that the coefficients $m_i$ are relatively slowly varying functions of time (of position); in these conditions, it is found that the output of the FM discriminator 8 is the instantaneous frequency

(12) $\quad \omega_i - \beta\dfrac{du_0}{dt} - \Sigma m_i\beta\dfrac{d\Delta_i}{dt}\cos(\beta\Delta_i-\delta_i)$ where $\omega_i$ is the intermediate angular frequency. If the reflection is missing the instantaneous frequency is $$\omega_i - \beta\frac{du_0}{dt}$$

Since the aircraft is moving at a constant velocity $\pm v$ this frequency is constant. However, this feature is not essential, because the velocity $v$ may be measured by means of a separate Doppler system. The quantity $$\omega_i - \beta\frac{du_0}{dt}$$

is substracted from the latter signal in the difference amplifier 9 providing the following difference:

(13) $\quad \Sigma m_i \beta\dfrac{d\Delta_i}{dt}\cos(\beta\Delta_i+\delta_i)$

Integrating this quantity in integrator 10, the resulting expression is

(14) $\quad \Sigma m_i \sin(\beta\Delta_i+\delta_i)$

It may be noted that the operation of integration in this case compensates for that of the differentiation which occurs in the FM discriminator 8. Passing the signal output of the integrator 10 through a constant amplitude, 90 degree phase shift network 11, the following result is obtained:

(15) $\quad \Sigma m_i \cos(\beta\Delta_i+\delta_i)$

Adding the quantity "one," the final output assumes the desired form for division.

(16) $\quad 1+\Sigma m_i \cos(\beta\Delta_i+\delta_i)$

The output of the adder 12 is coupled to a divider 13 as is the output of the amplitude modulation detector 6. The output of the divider 13 then is the amplitude modulation $K_1$ of the transmitted signal. The output of the divider 13, $K_1$, is then fed to a suitable utilization device. The nature of "divider 13" can be further described as follows:

The two inputs are respectively:

$$K_1[1+\Sigma m_i \cos(\beta\Delta_i+\delta_i)]$$

obtained by amplitude detection of the signal (1), and $$1+\Sigma m_i \cos(\beta\Delta_i+\delta_i)$$

obtained as Equation 16. Since the output of box 13 is shown to be "$K_1$," the latter is a "ratio divider."

Various types of electronically voltage controlled dividers are described in "Electronic Instruments" by Greenwood, Holdum and MacRae—Radiation Laboratory Series—vol. 21—pages 48 through 54, published by McGraw-Hill Book Company, Inc., 1948. Additional types of dividers are described in "Waveforms" by Chance et al., Radiation Laboratory Series—vol. 19—pages 668 through 678. In the first reference there are described dividers which operate (a) on the principle of an electronically controlled impedance on a divider ratio, (b) on the principle of a pulse controlled amplifier of one signal where the duty cycle of the pulse waveform is made proportional to the other signal. In the second reference it is shown that any multiplier may be transformed into a divider by means of feedback. Finally the use of logarithmic devices for division is discussed. The above-described system as included in the broken line rectangle 14 is utilized in similar fashion for the output of the intermediate frequency amplifier 5 to obtain the amplitude modulation of the transmitted signal of that channel and that amplitude modulation is also coupled to the suitable utilization device.

The system described above provides an instantaneous and continuous correction without imposing restrictions on the control modulation of $K_1$. It may be noted that the output of the FM discriminator exists only when a distortion component is present, while the output of the AM detector is always present.

The embodiment of FIGURE 2 describes a more general case for the cancellation of ground reflections. In FIGURE 3, there is disclosed a second embodiment for spurious reflection cancellation utilizing a gate to pass through only the desired signals. The elements in the block diagram of FIGURE 3 up to the amplitude modulation dectector 6 and the FM discriminator 8 are similar to the elements bearing the same numbers in FIGURE 2. The operation of this embodiment depends on the fact that the output of the FM discriminator is in zero crossing phase with the output of the AM detector 6. Therefore, pulses are derived in correspondence of the zero crossings of the signal representing the output of the FM discriminator 8, and these pulses are used to control an AND gate 15 placed at the output of the amplitude modulation detector 6. The gate 15 will be unblocked only at the instance of time at which the output signal is free from the distortion component. As a result, the output is the same that would be obtained in the absence of secondary reflections.

It can be shown that the output of the FM discriminator 8 consists of a D.C. component $\omega_1+\beta\nu$ and of a component $$m_i\beta\nu\left(1-\frac{du_2}{du_0}\right)\cos(\beta\Delta+\delta)$$

which is either added to or subtracted from the previous value depending on whether $$\frac{du_0}{dt}$$

is positive or negative. The variable portion of the FM discriminator output signal is a quantity which becomes zero at the same time that the distortion component of the AM detector 6 becomes zero, or in other words, is in "zero crossing phase" with the latter component. The signal produced at the output of the FM discriminator 8 is amplified and clipped symmetrically in the amplifier and clipper 16 so that it is transformed into a low amplitude rectangular A.C. quantity. The clipped signal is fed into a differentiator 17 and the differentiation provides narrow pulses which occur in correspondence with the zero crossings of the original signal. Applying these pulses to one of the inputs of the AND gate 15, the other input of which is the signal coming from the AM detector 6, provides an output which is free of the distortion component. The circuitry described enclosed in the rectangle is duplicated for the second channel output of the intermediate amplifier 5. If there are no spurious reflections, no FM signal is generated so that the AND gate 15 is open during that time. While the output of the embodiment of FIG. 2 produces a continuous distortion-free signal, the embodiment of FIG. 3 produces a distortion-free output only at those times when the zero crossing phase occurs. The output of adder 12 and the output of differentiator 17 may be coupled to an indicator 19 so that the presence of an error signal may be indicated to the pilot of the aircraft.

While we have described above the principles of our invention in connection with specific apparatus, it is to be clearly understood that this description is made only by way of example and not as a limitation to the scope of our invention as set forth in the objects thereof and in the accompanying claim.

We claim:

A system for suppression of spurious signals mixed with information signals, said information signals being amplitude modulated and said spurious signal being both amplitude modulated and frequency modulated, said frequency modulated signals being a function of said modulated spurious signals, comprising means to receive said mixture of signals, first means to detect said amplitude modulated spurious signals and information signals, second means to detect said frequency modulated spurious signals, said frequency modulated signals having a constant frequency component and a variable frequency component, means to subtract said constant frequency component from said detected frequency modulated signals, means to integrate said subtracted signal, means to shift the phase of said integrated signal, means to add the quantity "one" to said phase shifted signal to produce a signal equal to said detected spurious signals, dividing means coupled to the output of said first detection means and to said adding means whereby the output of said dividing means is said information signals free from said spurious signals.

References Cited by the Examiner

UNITED STATES PATENTS

| | | | |
|---|---|---|---|
| 2,152,515 | 3/39 | Wheeler | 325—474 |
| 2,173,156 | 9/39 | Beverage | 325—328 |
| 2,318,268 | 5/43 | Terman | 325—472 |
| 2,489,254 | 11/49 | Arnold et al. | 325—474 |
| 2,632,101 | 3/53 | Quarles | 325—61 |
| 2,744,247 | 5/56 | Wilmotte | 329—131 |
| 3,079,558 | 2/63 | Spencer | 325—478 |

DAVID G. REDINBAUGH, *Primary Examiner.*

SAMUEL B. PRITCHARD, *Examiner.*